United States Patent Office 3,516,413
Patented June 23, 1970

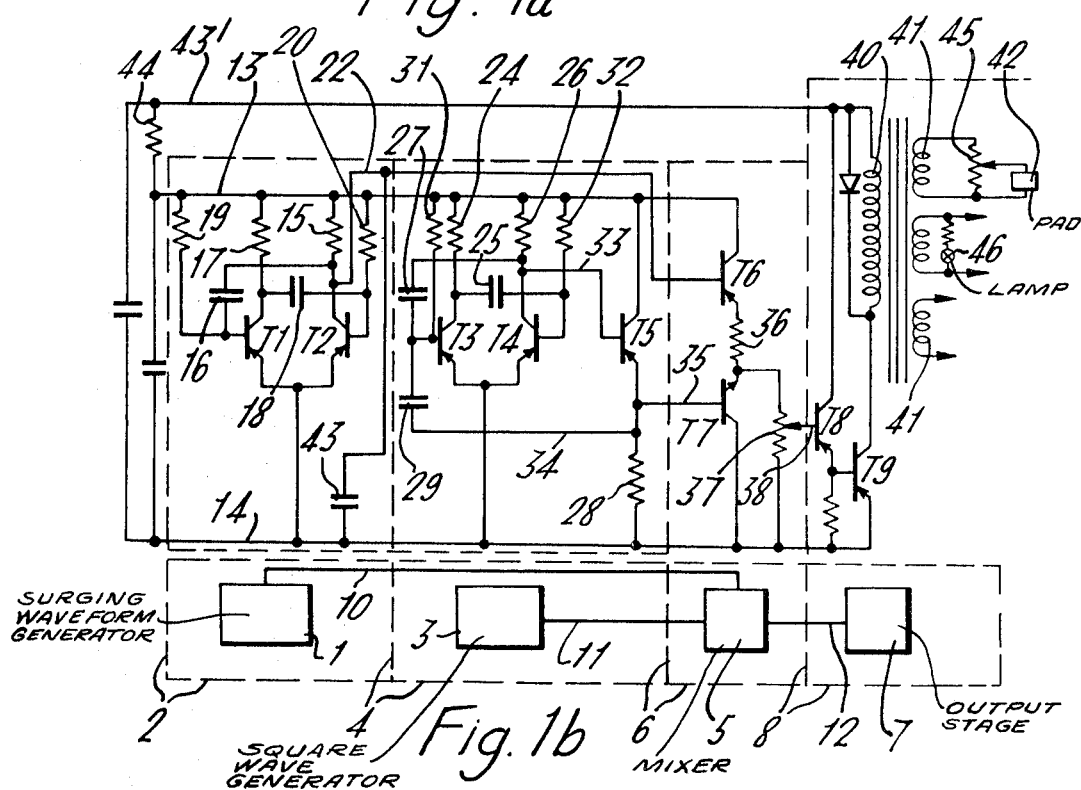
Fig. 1a
Fig. 1b
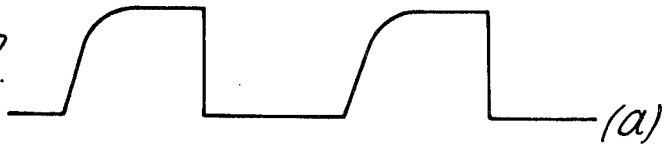
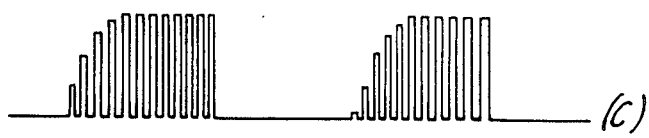
Fig. 2.
(a)
(b)
(c)

3,516,413
CIRCUIT ARRANGEMENT FOR AN ELECTRIC
MUSCLE STIMULATOR
Michael McDonald, 69 Clifford Road, Barnet, Hertfordshire, England, and Herman F. Schaefer, 22 Highbury Place, Highbury, London N. 5, England
Filed May 24, 1966, Ser. No. 552,531
Claims priority, application Great Britain, May 25, 1965, 22,444/65
Int. Cl. A61n 1/36
U.S. Cl. 128—422    9 Claims

ABSTRACT OF THE DISCLOSURE

A circuit for an electric muscle stimulator including a surging waveform generator, a square waveform generator, a mixer, and an output stage, in which the outputs from the surging waveform generator and the square waveform generator are applied to the mixer stage in such a way that the output from the square waveform generator provides 100% modulation of the signal output, from the mixing stage.

This invention relates to an electric circuit arrangement for developing signals which may be used to stimulate muscles.

These signals may be used therapeutically to stimulate mascles causing them to contract as in normal exercise and hence eventually improve their "tone."

According to the present invention there is provided a circuit arrangement including a surging waveform generator, a square wave generator, an active mixing stage to the inputs of which the output from the surging waveform generator and the output from the square wave generator are applied respectively, the square wave generator signals providing 100% modulation of the output signal from the mixing stage, the envelope of the output signal from the mixing stage being controlled in accordance with the output of the surging waveform generator, and an output stage to which the output from the mixer is applied.

An embodiment of the invention will now be described with reference to the accompanying drawings which show in FIG. 1a a schematic circuit diagram, in FIG. 1b a block circuit diagram and in FIG. 2 at (a), (b) and (c) the waveforms of signals which occur at various points in the circuit of FIG. 1a.

Referring to FIG. 1 there are shown block schematic representations illustrating the basic functions of the associated circuitry which is shown within the dotted lines. Thus block 1 represents the surging waveform generator, the detailed circuit of which is shown within the dotted lines 2, block 3 represents the square wave generator within the dotted lines 4, block 5 represents the active mixing stage within the dotted lines 6, and the block 7 represents the output stage within the dotted lines 8. The output from the block 1 is applied over lead 10 to one input of the active mixing stage 5, and the output from the active mixing stage 5 is applied over the lead 12 to the output stage 7 and to an output for the device.

From the detailed circuitry it may be seen that the surging waveform generator within the dotted lines 2 consists of transistors $T_1$ and $T_2$ which are connected, to form a free running multivibrator, between the current supply lines 13 and 14 together with a resistor 15 and a capacitor 16, a resistor 17 and a capacitor 18 and resistors 19 and 20. The surging waveform generator produces an output signal on lead 22 having a waveform substantially as shown at (a) in FIG. 2. This waveform shows the signal to be "on" for 750 milliseconds and "off" for the next 750 milliseconds. The timing of the waveform is determined by the constants of the circuit, and in the particular arrangement the resistor 19 has a value of 680,000 ohms, and the capacitor 16 a capacitance of 2.2 microfarads, while the resistor 20 has a resistance of 680,000 ohms and the capacitor 18 has a value of 1.5 microfarads. The shape of the leading edge of the waveform is determined by the resistor 15 and the capacitor 16.

The square wave generator within the dotted lines 4 consists of the transistors $T_3$, $T_4$ and $T_5$ which are connected, to form a free running compound multivibrator, between the supply lines 13, 14, together with a resistor 24 and a capacitor 25, a resistor 26 and a capacitor 27, a resistor 28 and a capacitor 29 and resistors 31 and 32. This generator produces an output signal, across the resistor 28, having a waveform substantially as shown at (b) in FIG. 2. This waveform shows the signal across the resistor 28 to be "on" for 200 microseconds and to be "off" for 15 milliseconds.

The shape and the timing of the output signal waveform results from the particular arrangement of the circuit components. The transistors $T_3$ and $T_4$ form together with the resistors 31, 24, 26 and 28 and the capacitors 27 and 25 a conventional multivibrator circuit with an output having a signal "on" to signal "off," or "mark" to "space", ratio which is approximately equal to 1. However for muscle stimulation it is preferable that the mark and space periods are not equal and in the present circuit arrangement this effect is achieved by applying the output from the transistor $T_4$ over a lead 33 to the base of the transistor $T_5$ which is connected as an emitter follower stage.

An output from the emitter follower stage is connected over a lead 34 and via the capacitor 29 to the base of the transistor $T_3$. The waveform at the output of the emitter follower stage is essentially the same as that appearing at the collector of the transistor $T_4$ and hence this arrangement is essentially equivalent to placing the capacitor 29 in parallel with the capacitor 27. The emitter follower stage has a low output impedance and thus the capacitor 29 may have a comparatively large value of capacitance without disturbing the square waveform of the signal which appears across the resistor 28. The result of the capacitor 29 being effectively in parallel with the capacitor 27 is that the mark space ratio of the signal waveform is greatly increased. In the particular arrangement shown the value of the capacitor 27 is 1000 pf., that of the capacitor 25 is 2,200 pf., and that of the capacitor 29 is 0.15 microfarad. The signal waveform resulting from this arrangement has, as is shown in FIG. 2(b), an "on" period of 200 microseconds and an "off" period of 15 milliseconds.

The active mixing stage, to which the output of the surging waveform generator is applied over the lead 22 and the output of the square wave generator is applied over a lead 35 from the emitter follower stage, includes a transistor $T_6$ and an NPN transistor $T_7$ in series connection with a resistor 36 between the current supply leads 13 and 14. The output from the mixing stage is developed across a potentiometer 37. The output signal from the surging waveform generator, which has the form shown in FIG. 2 at (a), is applied over the lead 22 to the base of the transistor $T_6$, and the output signal from the free running square wave generator, which has the form shown in FIG. 2 at (b) is applied over the lead 35 to the base of the transistor $T_7$. The signal applied to the base of the transistor $T_6$ determines whether or not the transistor conducts and thus whether or not current flows through resistor 36 and the potentiometer 37. The voltage between the junction of the resistor 36 and the potentiometer 37, and the lead 14 provides one control of the amount of current passed at any given time by the transistor $T_7$. A second control of the current passed by this transistor is provided by the output obtained from the emitter follower across the resistor 28. Thus it may be arranged that the potential across the potentiometer 37 due to the current flow through the transistor $T_6$ is at some instants such that the transistor $T_7$ is non-conducting and therefore does not pass the input signal applied to it from the square wave generator over the lead 35. At other instants the potential across the potentiometer 37 may be such that the transistor $T_7$ conducts so that the signal from the square wave generator is passed at an amplitude which is determined by the voltage on the emitter of the transistor. Such a control of the transistor $T_7$ is in many respects similar to the well known anode modulation control of a valve modulator.

The relationships between the input signals and the circuit components are such that in the present arrangement the output from the mixing circuit across the potentiometer 37 is as shown at (c) in FIG. 2 where there is shown a waveform envelope corresponding to the waveform of the signal shown at (a) in FIG. 2 and containing pulses at the repetition of those shown at (b) in FIG. 2 which provide 100% modulation of the mixing circuit output signal. The scale to which the signals shown at (b) in FIG. 2 is drawn is clearly larger than that used for the illustration of the waveform shown at (a) and (c).

The output from the mixing circuit is fed via the moving contact of the potentiometer 37 and the lead 38 to the output stage which includes the two transistors $T_8$ and $T_9$, a transformer which has a primary winding 40 and a number of secondary windings 41 to which pads such as that shown at 42 are connected. The pad 42 is applied to the body of the person being treated in order to stimulate the particular muscles concerned.

It will be seen that the leading edge of each pulse of the signal from the surging waveform generator, and hence the leading edge of each envelope pulse rises gradually until the maximum amplitude is reached. This is in order that the pulses in the output signal from the free running square wave generator do not reach their maximum instantaneously and hence cause discomfort to the person being treated.

A decouplnig capacitor 43 is connected to the lead 22 in order to decouple any signals from the square wave generator which might appear on the lead 22 and thus prevent them from being coupled to the surging waveform generator.

The power supply is connected between the leads 43' and 14, and the lead 13 is connected to the negative supply voltage via a resistor 44.

The circuit provides a comparatively simple source of bursts of square topped impulses having a mark to space ratio which may be of the order of 1 to 100 or more, wherein the bursts of pulses rise comparatively gradually to a maximum.

The circuit includes a potentiometer as shown at 45 connected across each of the independent secondary output windings so that the stimulating voltage supplied to the applicator pads may be controlled. In addition a neon indicator lamp as shown at 46 is connected in series with a fixed resistor across one of the secondary windings to indicate when the machine is operative.

We claim:
1. A circuit arrangement for an electric muscle stimulator including a surging waveform generator, a square wave form generator, an active mixing stage, said mixing stage including two transistors having their emitter-collector circuits connected in series and an output stage, the inputs of said mixing stage being connected to the output of said surging waveform generator and to the output of said square waveform generator respectively, the square wave generator providing 100% modulation of the output signal from the mixing stage, the envelope of the output signal being controlled in accordance with the output of the surging waveform generator, and the output stage being connected to the output from said mixer.

2. A circuit arrangement as claimed in claim 1 in which one of said transistors is an NPN transistor to the base of which the output from the square wave generator is applied.

3. A circuit arrangement as claimed in claim 1, in which said surging waveform generator includes transistors connected to form a free running multivibrator.

4. A circuit arrangement as claimed in claim 1, in which a resistor and a capacitor are connected to said surging waveform generator for shaping the leading edges of the envelope of the output signal.

5. A circuit arrangement as claimed in claim 1, in which the output of said mixing stage is connected across the resistance element of a potentiometer via the slider of which it is connected to the output stage.

6. A circuit arrangement as claimed in claim 1, in which said output stage includes two transistors and a transformer connected in tandem.

7. A circuit arrangement as claimed in claim 1, in which said surging waveform generator includes transistors connected to form a free running multivibrator and a resistor and a capacitor for shaping the leading edges of the envelope of an output signal, the output of said mixing stage is connected to the resistance element of a potentiometer via the slider of which it is connected to the output stage, and in which said output stage includes two transistors and a transformer connected in tandem.

8. A circuit arrangement for an electric muscle stimulator including a surging waveform generator, a square waveform generator, said square waveform generator including two transistors connected to form a free-running compound multivibrator with an output having a signal "on" to "off" or "mark" to "space" ratio of less than one, an emitter-follower stage, an active mixing stage, and an output stage, said emitter-follower stage being connected to the output of said multivibrator, the output transistor of said multivibrator having an additional feedback connection via said emitter follower stage, to the other transistor of the free-running compound multivibrator, the inputs of said mixing stage being connected to the output of said surging waveform generator and to the output of said emitter follower stage respectively, the square wave generator signals providing 100% modulation of the output signal from the mixing stage, the envelope of the output signal being controlled in accordance with the output of the surging waveform generator, and the output stage being connected to the output from said mixer.

9. An electric muscle stimulator comprising in combination a circuit arrangement which includes a surging waveform generator, a square waveform generator, a mixing stage, said mixing stage including two transistors having their emitter collector circuits connected in series, and an output stage, the inputs of said mixing stage being connected to the output of said surging waveform generator and to the output of said square waveform generator respectively, the square wave generator signals providing 100% modulation of the output signal from the mixing stage, the envelope of the output signal being controlled in accordance with the output of the surging waveform generator, and the output stage being connected to the output from said mixing stage; and at least one pad connected to the output of the output stage.

References Cited

UNITED STATES PATENTS

| | | | |
|---|---|---|---|
| 2,771,554 | 11/1956 | Gratzl | 128—421 |
| 2,823,311 | 2/1958 | Bastin. | |
| 3,185,939 | 3/1965 | Mess et al. | 128—422 X |
| 3,295,528 | 1/1967 | Masaki | 128—422 |

WILLIAM E. KAMM, Primary Examiner

U.S. Cl. X.R.

328—160; 331—52